United States Patent
Theuss

(10) Patent No.: US 7,012,751 B2
(45) Date of Patent: Mar. 14, 2006

(54) SEMITRANSPARENT MIRROR AND METHODS FOR PRODUCING AND OPERATING SUCH A MIRROR

(75) Inventor: Horst Theuss, Wenzenbach (DE)

(73) Assignee: Infineon Technologies AG, (DE)

( * ) Notice: Subject to any disclaimer, the term of this patent is extended or adjusted under 35 U.S.C. 154(b) by 0 days.

(21) Appl. No.: 10/831,134

(22) Filed: Apr. 26, 2004

(65) Prior Publication Data

US 2004/0223243 A1   Nov. 11, 2004

(30) Foreign Application Priority Data

Apr. 24, 2003   (DE) ............................... 103 18 667

(51) Int. Cl.
   *G02B 27/00*  (2006.01)
(52) U.S. Cl. ...................... 359/578; 359/580; 359/582; 359/589
(58) Field of Classification Search ................ 359/883, 359/577–580, 582, 587, 589
   See application file for complete search history.

(56) References Cited

U.S. PATENT DOCUMENTS 6,078,558 A    6/2000  Bruneau et al.
2002/0119278 A1  8/2002  Bechevet et al.

FOREIGN PATENT DOCUMENTS

JP          04115214 A    4/1992

*Primary Examiner*—Fayez G. Assaf
(74) *Attorney, Agent, or Firm*—Edell, Shapiro & Finnan, LLC

(57) ABSTRACT

The invention relates to a semitransparent mirror and a method for producing and for operating the semitransparent mirror. The semitransparent mirror has a transparent substrate, a first protective layer that is arranged on the substrate, and a layer with a phase change medium, which is arranged on the first protective layer. The layer is covered by a second protective layer that protects the phase change medium.

15 Claims, 3 Drawing Sheets

SEMITRANSPARENT MIRROR AND METHODS FOR PRODUCING AND OPERATING SUCH A MIRROR

CROSS REFERENCE TO RELATED APPLICATIONS

This application claims priority under 35 USC §119(e) to German Application No. 103 18 667.0, filed on Apr. 24, 2003, and titled "Semitransparent Mirror and Methods for Producing and Operating Such a Mirror," the entire contents of which are hereby incorporated by reference.

BACKGROUND OF THE INVENTION

I. Technical Field

The invention relates to a semitransparent mirror and optical units with such a mirror, and to methods for producing and operating such a mirror.

II. Discussion of Related Art

A transparent substrate is coated with thin layers for a semitransparent mirror. During the production, a predetermined ratio of reflectivity and transparency of the semitransparent mirror is set with the aid of the thickness of the layers. The disadvantage of such semitransparent mirrors is that this ratio of reflectivity and transparency can be changed only by depositing additional layers on the substrate, or by removing layer thicknesses by etching. Both of these require a high outlay on systems, material and method time. Corrections to the ratio of reflectivity and transparency of a semitransparent mirror also assume that the semitransparent mirror is removed from an optical unit and fed to the vapor deposition or etching installation, and is subsequently expensively reinstalled in the unit.

OBJECTS AND SUMMARY OF THE INVENTION

Accordingly, it is an object of the invention to specify a semitransparent mirror and a method for producing and operating it, in which the ratio of reflectivity and transparency can be changed without cost owing to installations or materials.

The semitransparent mirror according to the invention has a transparent substrate. A first protective layer is arranged on this substrate, and a layer that has a phase change medium is applied to this first protective layer. A second protective layer covers the phase change medium and protects it against environmental influences.

Such a semitransparent mirror has the advantage that the phase change effect of the phase change medium is used to change the ratio of reflectivity and transparency. Here, the optical behavior of the layer composed of the phase change medium can be changed and adapted by irradiation of pulsed laser light. A further advantage of this semitransparent mirror is that it can remain in its optical unit for the purpose of adapting and changing the ratio of reflectivity and transparency, and that, if need be, the ratio of reflectivity and transparency can be set using the same laser light source that is already present in the optical unit.

A further advantage of such a semitransparent mirror with a layer composed of a phase change medium is that a mirror which can be modified in such a way can also be switched on and off, for example from virtually 90% transmission to virtually 10% transmission. Moreover, the setting of the ratio of reflectivity and transparency can be set virtually continuously from virtually 90% reflectivity to virtually 90% transmission. Finally, it is possible to achieve subsequent fine settings of the intensities of different optical paths in optoelectronic components, as well as trimming and adjusting of optical housings without the need to provide mechanical actuators.

It is thereby possible to implement spatially relatively compact units with a semitransparent mirror according to the invention. Optical assemblies with beam splitters are generally preferred applications of the semitransparent mirror. The semitransparent mirror according to the invention can advantageously be used in optical measurement technology and sensor systems. A wide field of application is found in holography and/or interferometry, for example in a Fourier interferometer. The subsequent trimming of optical assemblies can be carried out without a problem using the semitransparent mirror of the invention. Again, the semitransparent mirror permits light to be branched off temporarily from an optical path, for example for test purposes.

It is provided in one embodiment of the invention that the phase change medium is a semiconductor material that has an amorphous and/or crystalline structure as a function of a thermal treatment. The phase change effect between amorphous and crystalline structures is particularly prominent in semiconductor materials. Thus, large-area layers, both amorphous and crystalline, are possible with IV—IV semiconductors such as silicon or germanium. However, for pure IV—IV semiconductors such as germanium and silicon the phase change effect requires a high thermal energy in order to be triggered. Again, binary III–V semiconductors such as gallium arsenide, indium phosphide and gallium phosphide exhibit the phase change effect, but during thermal treatment there is the risk of destruction of III–V semiconductor material because of the readily volatile components of gallium and indium. By contrast, the phase change effect is particularly prominent with ternary semiconductors such as IV–V–VI semiconductors, alternatively quarternary alloys such as silver indium antimony tellurite also exhibit a phase change effect.

It is preferable to use for the semitransparent mirror a phase change medium that has germanium antimony tellurite, this material permitting a phase change from amorphous to crystalline and vice versa with relatively low irradiation of energy. By irradiating light in the form of laser pulses of suitable power, wavelength and a very short time duration in the range of nanoseconds, crystalline material of the ternary semiconductor composed of germanium antimony tellurite is heated up briefly to above the melting point. The neighboring protective layers subject the layer made from phase change medium to a rapid dissipation of heat, and so this quenching operation leads to amorphization of the crystalline material. In the course of the resulting rapid cooling, the material has no chance to crystallize, and solidifies in the amorphous state of the melt.

Conversely, this amorphous state can be reversed by briefly heating the material up until a recrystallization temperature is reached by irradiating energy. At the same time, a longer pulse duration ensures that the material crystallizes owing to the cooling that sets in more slowly, and thereby returns to the initial state. In order for the required energy that is to be irradiated to be kept at a low level, the layer made from phase change medium has a small thickness of between 15 and 50 nm, preferably of between 20 and 30 nm.

The first protective layer ensures that the phase change medium does not react with the substrate material during the brief melting operation. The second protective layer supports the quick dissipation of heat and ensures that the melted phase change medium does not react with the surroundings. The protective layers have a thickness of between 50 and 200 nm in this case. The dissipation of heat can be supported, in addition, by a third layer in the form of a cover layer that simultaneously functions as a heat sink. Such a cover layer has aluminum and/or an aluminum alloy, and is arranged at a thickness of 50 to 120 nm, preferably 70 to 100 nm, on the second protective layer.

The first and the second protective layers can have a mixture of zinc sulfite and silicon dioxide, the silicon dioxide ensuring the transparency that such protective layers have, and the zinc sulfite serving the purpose of thermal absorption.

A further embodiment of the invention provides an additional energy source for setting the ratio of reflectivity and transmission of the semitransparent mirror. This is particularly advantageous whenever the semitransparent mirror is provided for measuring or signaling beams and the energy source of the measuring unit does not suffice in order to provide in nanoseconds the melting energy for setting the ratio of transmission and reflectivity.

A method for producing a semitransparent mirror has the following method steps. Firstly, a transparent substrate is provided. A first protective layer is applied to a surface of the substrate. A layer composed of a phase change medium is subsequently deposited on this layer. Finally, a second protective layer is then applied to the phase change medium and a cover layer can subsequently be applied to the second protective layer. The transparent substrate can be a glass plate, quartz plate or sapphire plate polished on at least one side. The first protective layer is then applied to the polished surface at a thickness of between 50 and 200 nm and consists, for example, of a mixture of zinc sulfite and silicon dioxide.

Such a layer can be applied by means of sputtering technology, in the case of which a zinc sulfite silicon dioxide target is atomized, and this material is deposited on the polished surface of the transparent substrate in a uniform fashion. The layer of the phase change medium is, by contrast, substantially thinner, at 15 to 50 nm, and can likewise be applied with the aid of sputtering technology. For this purpose, a target composed of $Ge_2Sb_2Te_5$ is atomized, and the atomized material is deposited on the already produced first protective layer.

The phase change medium is distinguished in that it can be present both in amorphous and in crystalline state as a function of a thermal treatment, and can have all the intermediate stages between amorphous and crystalline in a continuous fashion. The ratio between reflectivity and transparency can be set continuously, since crystalline material has a low transparency and a high reflectivity in a prescribed range of optical wavelength. In order to achieve the amorphous state, the phase change medium is briefly heated, that is to say for a few nanoseconds, above its melting point and cooled at high speed. This quick cooling rate is ensured, on the one hand, by the minimum thickness of the layer of between 15 and 50 nm and, on the other hand, by thermal dissipation to the first and second protective layers.

Moreover, the dissipation of heat can be accelerated by applying to the second protective layer a cover layer that is composed of aluminum of from 50 to 120 nm, preferably from 70 to 100 nm, and which serves as heat sink. In order to recrystallize the phase change material, the latter is heated only up to a recrystallization temperature below the melting point, but kept longer at this recrystallization temperature. This can be achieved by expanding the heating spot of a laser beam.

The second protective layer can have the same material as the first protective layer, and additionally serves for dissipating heat so that when the phase change medium is being melted there is neither a chemical reaction with the substrate material nor a chemical reaction with the surroundings or with the cover layer composed of aluminum or an aluminum alloy. The protective layers therefore advantageously ensure that the chemical composition of the layer composed of a phase change medium does not change, and so there is virtually no restriction on the possible setting, the adjustment or trimming of the ratio between reflectivity and transmission of the semitransparent mirror.

Aside from plate-shaped substrates, it is also possible to coat end pieces of glass fibers with such a layer sequence in order to tune a number of glass fiber paths to one another in terms of their light intensity. Moreover, optical components can be provided with such a layer sequence inside a housing of an optical assembly in order to adapt or trim optical paths. The possible change in the absorption of the layer composed of phase change material is small in this case, the more so as, on the one hand, the layer itself is exceptionally thin at 15 to 50 nm and as, on the other hand, it can be assumed that the probability of the formation of phonons in an amorphous material in excitation by irradiation of light is even less than that of the formation of phonons in a crystalline material, which means it can be assumed that the absorption of the phase change medium changes only insubstantially when there is a change between amorphous and crystalline states.

In the case of the low layer thicknesses, this assumption is justified for the following reasons, since absorption in a solid body means the excitation of damped oscillating systems by incident electromagnetic waves. Given the amorphization undertaken for the semitransparent mirror, the absorption spectrum of such excitable oscillations is on the one hand expanded, since the periodicity of the lattice is disturbed and only a close-range order remains. On the other hand, excitable lattice oscillations scarcely still remain because of the destruction of the periodicity of the crystalline lattice, and so it may be assumed that the absorption becomes smaller with increasing amorphization, and thereby intensify the effect of the increased transparency.

The reduced reflectivity that forms owing to amorphization has the effect that the reduced decrease in absorption leads to a correspondingly slight increase in transmission. It is possible to achieve a change in transmission of up to 90% with the aid of the amorphization of the phase change medium, the transmission being high in the amorphous state of the phase change medium, and low when the phase change medium has crystallized.

A method for operating a semitransparent mirror has the following method steps. Firstly, a semitransparent mirror is provided for a unit. Pulsed energy packets, for example from a laser light source, are applied to said semitransparent mirror during operation, in order to set the ratio between reflectivity and transparency. After the pulsed energy packets have been applied to the mirror, the distribution of a measuring or signaling beam on the semitransparent mirror has changed owing to the newly set ratio between reflectivity and transparency.

The application of pulsed energy packets to the mirror can be performed, on the one hand, by the energy source of the measuring or signaling beam, or independently thereof by means of a second energy source, whose focussed beam scans the entire surface of the semitransparent mirror. A separate second energy source for setting the ratio of reflectivity and transparency has the advantage of enabling a very precise adaptation and trimming of the semitransparent mirror. Such a separate second energy source is always required whenever the energy source of the measuring or signaling beam is not sufficient to produce the molten state of the phase change medium at certain points for a few nanoseconds.

It may be stated in summary that semitransparent mirrors are used for beam splitting in the most varied optical applications such as sensor systems, interferometry, holography. A mirror whose transmission can be varied, outside very wide limits by irradiation with infrared laser light substantially expands the possibilities for such optical assemblies.

The present invention discloses a mirror whose reflectivity and transmission can be reversibly varied by the irradiation of light. Use is made in this case of the principle of the phase change effect. Phase change media are implemented for this purpose by means of a layered system. By irradiating light in the form of laser pulses of suitable power, wavelength and a very short time duration, it is possible to heat up crystalline material briefly within nanoseconds up to above the melting point. The neighboring layers of the phase change medium ensure a rapid dissipation of heat, and thus a quenching operation. During the resulting rapid cooling, the material has no possibility to crystallize any more, but forms an amorphous state.

The present invention utilizes the different transmission behavior in amorphous and crystalline states. The amorphous state can be reversed by renewed irradiation of laser light at a lower intensity and of longer pulse duration. The material is heated in this case, but only to a recrystallization temperature. During the cooling that sets in more slowly in this case, the material recrystallizes and the initial state of high reflectivity and low transparency is reproduced.

BRIEF DESCRIPTION OF THE DRAWINGS

The invention will now be explained in more detail with the aid of the attached drawings, in which.

DETAILED DESCRIPTION OF THE PREFERRED EMBODIMENTS

Figure 1:
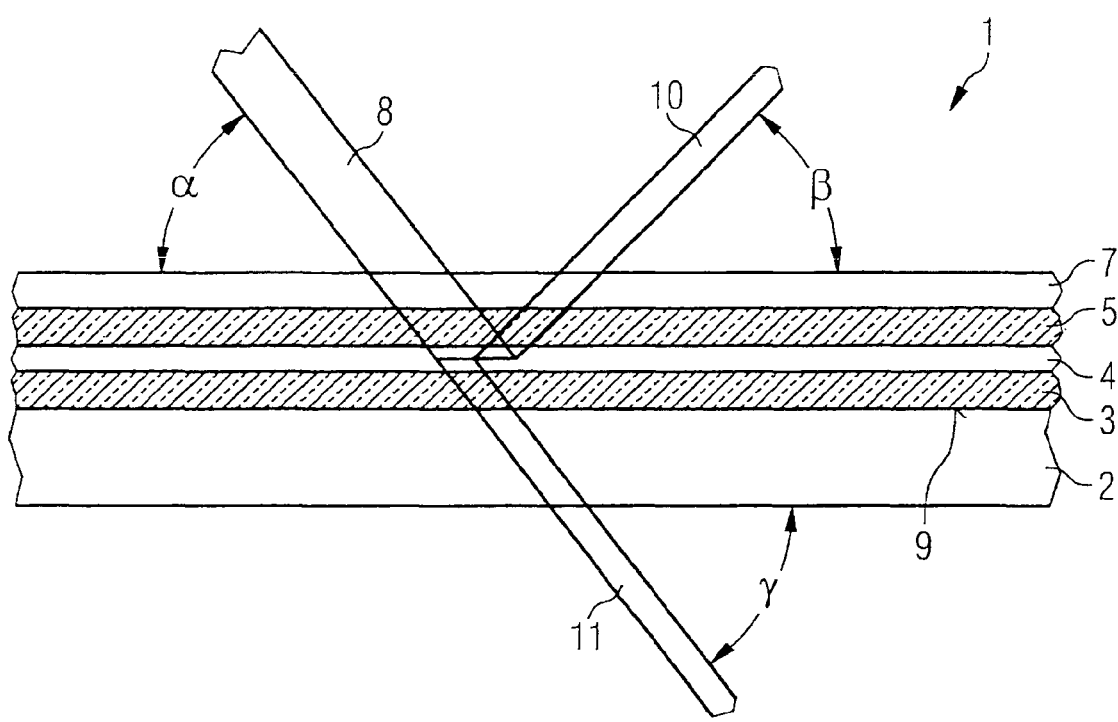
FIG. 1 is a schematic diagram in partial section of the mode of operation of the semitransparent mirror of the invention.

FIG. 1 shows a schematic illustration of the mode of operation of the semitransparent mirror 1 of the invention. In this embodiment, the semitransparent mirror 1 has a substrate 2 composed of glass that is transparent to the wavelength of an incident measuring or signaling beam 8. In this embodiment of the invention, there is applied to the substrate 2 a layer sequence with a first protective layer 3 that is arranged on a polished top side 9 of the substrate 2. This first protective layer 3 has a thickness of between 50 and 200 nm and is composed of a mixture of zinc sulfite and silicon dioxide.

A layer 4 with a phase change medium of a thickness of between 15 and 50 nm is applied to this first protective layer 3. This layer 4 can be present in an amorphous or crystalline phase and continuously assume any intermediate state. Applied to the layer 4 with a phase change medium is a second protective layer 5, which in this embodiment has the same composition and the same thickness as the first protective layer 3.

A cover layer 7 is arranged on the second protective layer 5 as conclusion of this layer sequence. The cover layer 7 has aluminum or an aluminum alloy with a thickness of between 50 and 100 nm. Because of its high thermal conductivity, the cover layer 7 composed of aluminum promotes quick cooling of the phase change medium during an amorphization phase. In order to set the degree of amorphization, and thereby to set the ratio between reflectivity and transparency, of the semitransparent mirror 1, it is possible to use either the measuring or signaling beam 8 when it has a suitable power and wavelength and scanning is performed over the entire area of the semitransparent mirror 1 with a simultaneous output of short light pulses in the nanosecond range.

When the radiation source of the measuring or signaling beam 8 is not suitable for setting the degree of amorphization, use is made of a second energy source that is provided for setting the degree of amorphization and thus for setting the ratio between reflectivity and transparency. After conclusion of the setting of the ratio between reflectivity and transparency on the mirror surface as a whole, the transparent mirror 1 can be used as beam splitter, as is shown in FIG. 1 by the measuring or signaling beam 8.

The measuring or signaling beam 8 is split at the layer 4 of the phase change medium into a reflected component beam 10 and a transmitted component beam 11. The reflected component beam 10 is emitted at the egress angle β, which is equal to the incidence angle α. The emission angle γ at which the transmitted component beam 11 leaves the semitransparent mirror 1 likewise corresponds to the angle α. The representation of the beam splitting in FIG. 1 is greatly simplified, since the refraction processes at the individual layer transitions and the transition from the surroundings to the cover layer 7, as well as the transmission from the substrate 2 to the surroundings are detected in the representation of the beam splitting of the measuring or signaling beam 8.

Figure 2:
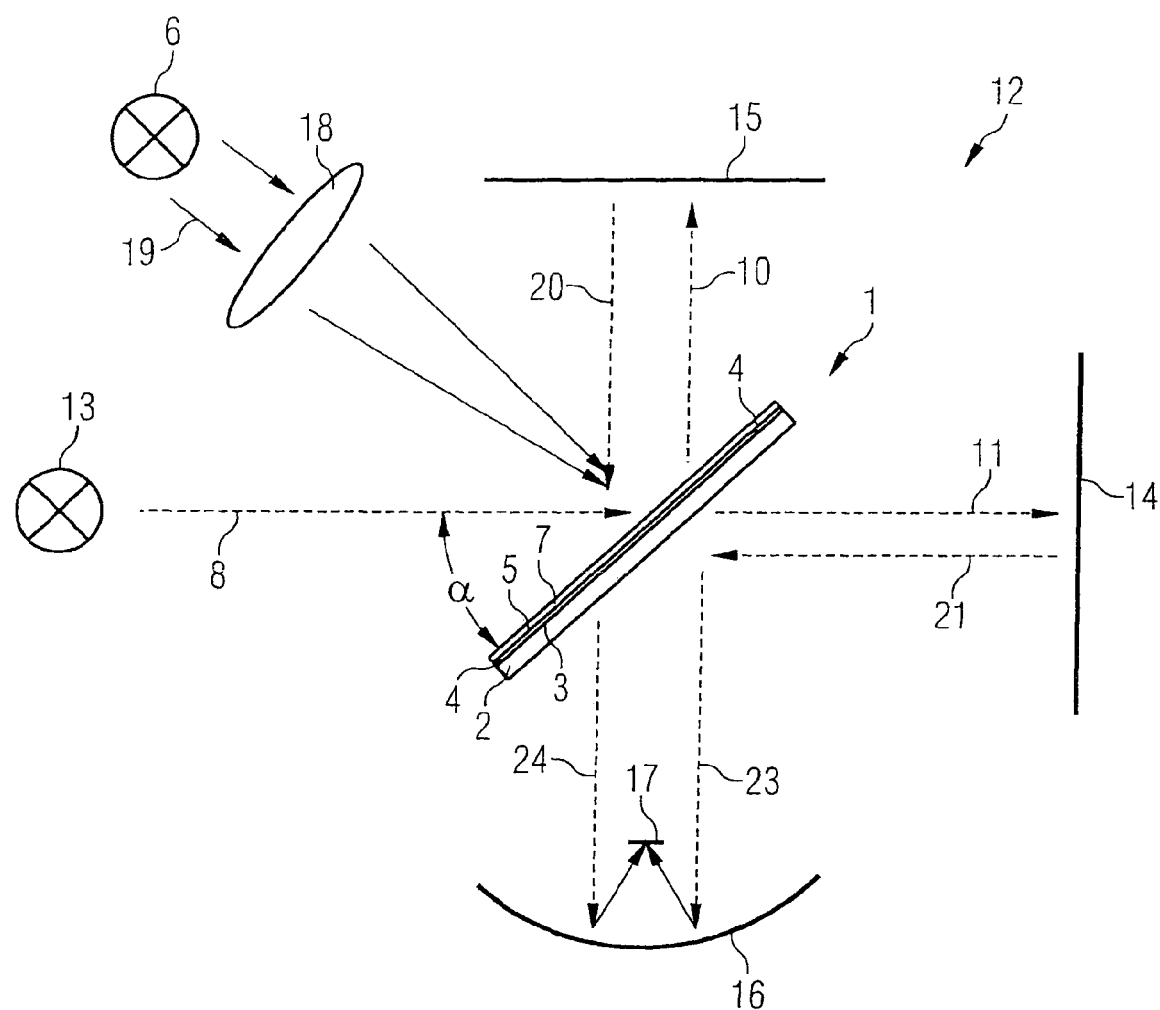
FIG. 2 is a schematic diagram of an interferometer with a semitransparent mirror of the invention.

FIG. 2 shows a schematic of an interferometer 12 with a semitransparent mirror 1 of the invention. In this embodiment, the interferometer 12 has two energy sources 6 and 13. The energy source 13 can be a laser unit that directs a measuring or signaling beam 8 on to the semitransparent mirror 1. The semitransparent mirror 1 has a transparent substrate 2 and the protective layers 3 and 5, between which the layer 4 of the phase change medium is arranged. A cover layer 7 serves to increase the dissipation of heat during the operation of setting the ratio of reflectivity and transparency of the semitransparent mirror 1. The second energy source 6 is a laser light source that outputs short laser light pulses in the nanosecond range of suitable power and suitable wavelength for setting the ratio between reflectivity and transparency of the phase change medium of the layer 4.

An optical deflecting system 18 is used to deflect the laser beam 19 of the additional second energy source 6 and to guide it over the entire surface of the semitransparent mirror 1 in order to set the ratio between reflectivity and transparency. The semitransparent mirror 1 is aligned at an angle α of 45° to the measuring or signaling beam 8.

Aside from the semitransparent mirror 1, the interferometer 12 has two plane mirrors 14 and 15, the first plane mirror 14 reflecting the transmitted component beam 11 of the measuring or signaling beam 8, and the plane mirror 15 reflecting the reflected component beam 10 of the measuring or signaling beam 8. The reflected beams 20 and 21 are superimposed on one another and form reference beams 23 and 24 that are reflected by a concave mirror 16 on to a measuring surface 17 in the region of the focus of the concave mirror 16, in order to image and measure the interference phenomena.

The interferometer 12 according to the invention differs from a Michelson interferometer in that the semitransparent mirror 1 can be set with reference to its reflectivity and transparency, and that a second energy source 6 with a deflecting device 18 is provided for setting the ratio between reflectivity and transparency. The wavelength of the laser beam 19 of the energy source 6 is tuned to the phase change medium of the layer 4 of the semitransparent mirror 1 at 650 nm. Moreover, the power of the laser pulses of the energy source 6 is adapted to the requirements of the phase change medium of the layer 4. The transparency of the semitransparent mirror 1 can therefore be manipulated by the energy source 6, as a result of which the light intensity can be controlled and distributed reversibly between the component beams 10 and 11. One of the two plane mirrors 14 or 15 is displaceably arranged in order to set the path difference between the component beams 10 and 11. The interference pattern on the measuring surface 17 changes correspondingly upon displacement of one of the plane mirrors 14 or 15.

Figure 3:
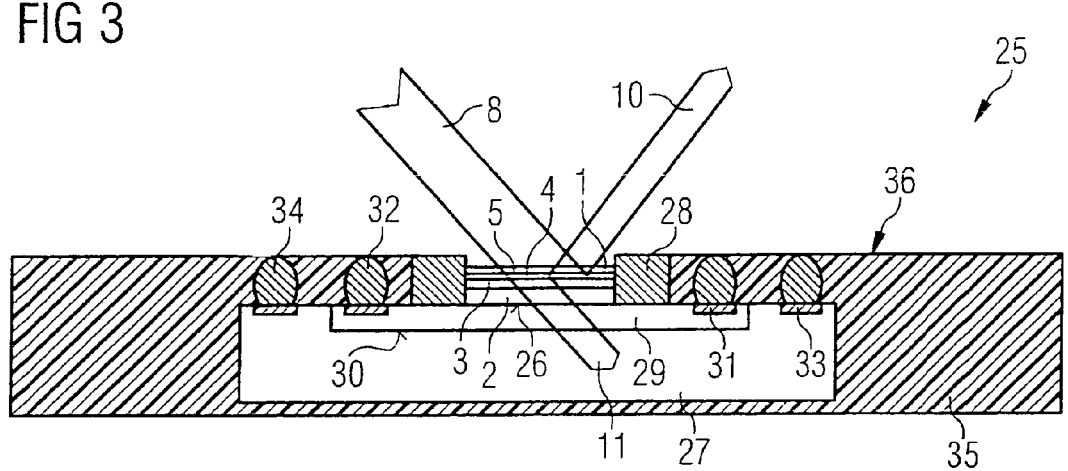
FIG. 3 is a view in elevation and partial section of an optoelectronic component using flip chip technology with a semitransparent mirror that is arranged on a sensor surface of a semiconductor chip.

FIG. 3 shows an optoelectronic component 25 using flip chip technology and having a semitransparent mirror 1 that is arranged on a sensor surface 26 of a semiconductor chip 27. The sensor surface 26 of the semiconductor chip 27 is circular and is delimited by a ring electrode 28 between which the semitransparent mirror 1 is arranged. The sensor surface 26 belongs to a sensor region 29 of the semiconductor chip 27 with a PN junction 30. Contact surfaces 31 that bear the flip chip contacts 32 are arranged in the edge region of the sensor region 29.

Further contact surfaces 33 are arranged outside the sensor region 29 on the top side of the semiconductor chip 27 with the aid of corresponding flip chip contacts. A measuring signal that corresponds to the transmitted component beam 11 can thereby be tapped between the flip chip contacts 32 and 34. The semiconductor chip is surrounded by a plastic compound 35 that simultaneously forms a housing of the optoelectronic component 25. In the embodiment of the optoelectronic component 25 the measuring voltage can be tapped on the same side of the housing 36 between the flip chip contacts 32 and 34 on which the semitransparent mirror 1 is arranged.

Figure 4:
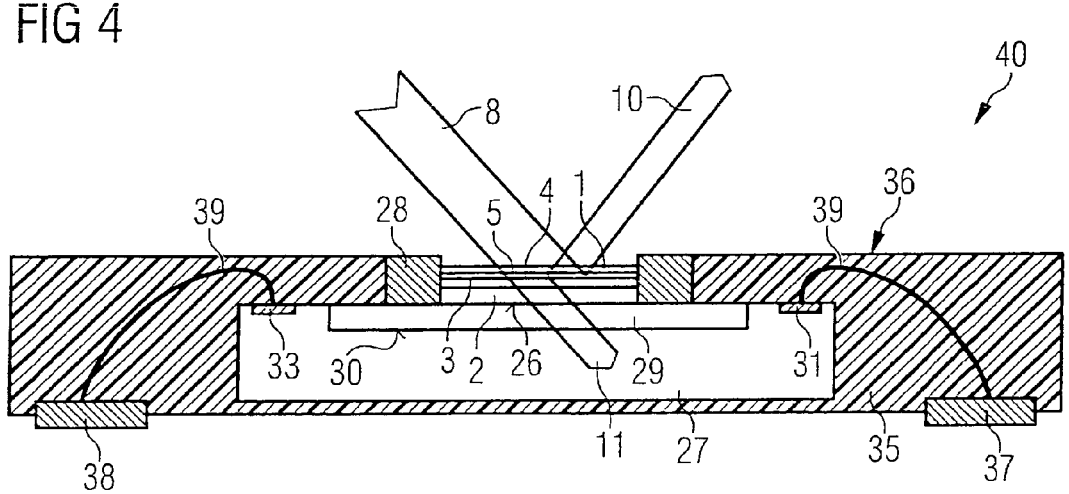
FIG. 4 is a view in elevation and partial section of an optoelectronic component using bonding technology with a semitransparent mirror that is arranged on a sensor surface of a semiconductor chip.

FIG. 4 shows an optoelectronic component 40 using bonding technology and having a semitransparent mirror 1 that is arranged on a sensor surface 26 of a semiconductor chip 27. Components with the same functions as in FIG. 3 are marked with the same reference numerals. This optoelectronic component 40 also has a housing 36 composed of a plastic compound 35. The semiconductor chip 27 embedded in the plastic compound has a sensor region 29 with a sensor surface 26 and a contact surface 31. The sensor surface 26 is circular and is delimited by a circular ring electrode 28 in which the semitransparent mirror 1 is arranged. At least one further contact surface 33 is provided outside the sensor region 29 of the semiconductor chip 27 such that there occurs between the contact surfaces 33 and 31 a photovoltage that is triggered by the transmitted component beam 11 of the measuring or signaling beam 8.

In a departure from the embodiment according to FIG. 3, in this optoelectronic component 40 the measuring signal is conducted via bonding wires 39 from the contact surfaces 31 and 33 to outer contact surfaces 37 and 38, respectively, which are arranged on the side of the housing 36 opposite the semitransparent mirror 1. Through varying the ratio between reflectivity and transparency of the semitransparent mirror 1, such an optoelectronic component 40 can be used as an optoelectronic switch by varying the ratio of reflectivity and transparency from crystalline to amorphous and vice versa by irradiating energy packets.

List of Reference Numerals
1 Semitransparent mirror
2 Transparent substrate
3 First protective layer
4 Layer with a phase change medium
5 Second protective layer
6 Energy source for setting the transmission
7 Cover layer
8 Measuring or signaling beam
9 Polished top side of the substrate
10 Reflected component beam
11 Transmitted component beam
12 Interferometer
13 Second energy source
14 Plane mirror
15 Plane mirror
16 Concave mirror
17 Measuring surface
18 Optical deflecting system
19 Laser beam
20 Reflected beam
21 Reflected beam
23, 24 Interference beams
25 Optoelectronic component
26 Sensor surface
27 Semiconductor chip
28 Ring electrode
29 Sensor region
30 PN Junction
31 Contact surface
32 Flip chip contacts
33 Contact surface
34 Flip chip contacts
35 Plastic compound
36 Housing
37 Outer contact surface
38 Outer contact surface
39 Bonding wires
40 Optoelectronic component
α Incidence angle
β Egress angle
γ Emission angle

What is claimed is:

1. A semitransparent mirror comprising:
a transparent substrate;
a first protective layer arranged on the substrate;
a layer with a phase change medium arranged on the first protective layer; and
a second protective layer arranged on the phase change medium;
wherein a ratio of reflectivity to transmission of the phase change medium is selectively and continuously adjustable during use of the mirror from 90% reflectivity to 90% transmission.

2. The semitransparent mirror of claim 1, wherein the phase change medium comprises a semiconductor material that has an amorphous and/or crystalline structure as a function of thermal treatment.

3. The semitransparent mirror of claim 1, wherein the phase change medium comprises germanium antimony tellurite.

4. The semitransparent mirror of claim 1, wherein each of the first and second protective layers comprises a mixture of zinc sulfite and silicon dioxide.

5. The semitransparent mirror of claim 1, wherein the phase change medium controls the ratio between reflectivity and transparency as a function of thermal treatment.

6. The semitransparent mirror of claim 1, wherein the phase change medium splits an incident beam into reflected and transmitted components.

7. An optical apparatus to process optical beams comprising:
an optical unit to receive and direct an incident optical beam including a semitransparent mirror including a transparent substrate, a first protective layer arranged on the substrate, a layer with a phase change medium arranged on the first protective layer and a second protective layer arranged on the phase change medium, wherein a ratio of reflectivity to transmission of the phase change medium is selectively and continuously adjustable during use of the mirror from 90% reflectivity to 90% transmission; and
a detector unit to detect a resultant beam from said optical unit for at least one of valuation and analysis.

8. The optical apparatus of claim 7, wherein the optical apparatus is one of an interferometer and a holographic unit.

9. The optical apparatus of claim 7 further including an energy source to set the transmission of the semitransparent mirror.

10. The optical apparatus of claim 9, wherein the energy source is configured to generate a focused beam that scans an entire surface of the semitransparent mirror to facilitate setting the transmission of the semitransparent mirror.

11. The optical apparatus of claim 7, wherein the optical apparatus is one of an optical trimming apparatus and an optical switch.

12. The optical apparatus of claim 7, wherein the phase change medium controls the ratio between reflectivity and transmission as a function of thermal treatment.

13. A method of producing a semitransparent mirror comprising:
providing a transparent substrate;
applying a first protective layer to the substrate;
applying a layer including a phase change medium to the first protective layer, wherein a ratio of reflectivity to transmission of the phase change medium is selectively and continuously adjustable during use of the mirror from 90% reflectivity to 90% transmission;
applying a second protective layer to the phase change medium; and
applying a cover layer to the second protective layer.

14. The method of claim 13, wherein a thermally conducting layer is applied as the cover layer.

15. A method of operating a semitransparent mirror comprising:
providing a semitransparent mirror including a transparent substrate, a first protective layer arranged on the substrate, a layer with a phase change medium arranged on the first protective layer and a second protective layer arranged on the phase change medium;
applying pulsed energy packets to the mirror in order to selectively and continuously adjust a ratio of reflectivity to transmission of the phase change medium to values ranging from 90% reflectivity to 90% transmission; and
applying a measuring or signaling beam with beam splitting of the measuring or signaling beam as a function of the set reflectivity and transmission.

* * * * *